United States Patent [19]
Jesselallee et al.

[11] 3,865,530
[45] Feb. 11, 1975

[54] PRESSURE CONTROL DURING BLOW-MOULDING

[76] Inventors: Jesselallee, 21 e, 2 Hamburg 73, 21 E; Karl-Heinrich Seifert, Hauke-Haien-Weg 15, 2 Hamburg, 73, 15, Germany

[22] Filed: July 26, 1972

[21] Appl. No.: 275,141

[30] Foreign Application Priority Data
Aug. 18, 1971 Germany.............................. 2141429

[52] U.S. Cl. 425/387 B, 425/DIG. 204, 425/DIG. 216
[51] Int. Cl.............................................. B29d 23/03
[58] Field of Search........... 425/DIG.204, DIG. 215, 425/DIG. 203, DIG. 206, DIG. 209, DIG. 216, 387 B, 242 B, 326 B

[56] References Cited
UNITED STATES PATENTS

| | | | |
|---|---|---|---|
| 3,390,426 | 7/1968 | Turner et al. | 425/DIG. 204 |
| 3,461,503 | 8/1969 | Dockery | 425/DIG. 204 |
| 3,740,180 | 6/1973 | Sidur | 425/DIG.204 |

*Primary Examiner*—Richard B. Lazarus
*Attorney, Agent, or Firm*—Frank R. Thienpont

[57] ABSTRACT

The injection mandrel of a blow-moulding apparatus has a cup-shaped element fitted on the end thereof. A pressurised medium fed through the mandrel enters the mould cavity through an annular gap between the element and the stem of the mandrel. During the blow-moulding operation, the element moves relative to the mandrel to vary the radial dimension of said gap and thus the pressure within the mould cavity.

4 Claims, 3 Drawing Figures

PATENTED FEB 1 1 1975

3,865,530

PRESSURE CONTROL DURING BLOW-MOULDING

BACKGROUND OF THE INVENTION

This invention relates to a method of and device for controlling the pressurised medium supplied to a blow-moulding installatiion in order to inflate a hollow slug of thermoplastic material to form the desired hollow body. In known blow-moulding installations, the injection lances or mandrels on which the hollow slug is fitted are supplied with a pressurised medium of adequately high pressure.

An object of the invention is to control the blow-moulding operation in such manner that the hollow body achieves optimum characteristics in terms of the strength of its walls, and also uniform wall thickness. A further object of the invention is to provide means whereby it is possible, in a simple and convenient manner, to control the blow-moulding operation and several of the functions performed in the course of the blow-moulding operation.

SUMMARY OF THE INVENTION

The pressure of the pressurised medium applied to the slug is modified as a function of the elapsed time of the blow-moulding operation. The pressurised medium is thus given a specific characteristic which is critical if a successful blow-moulding operation is to be achieved. Furthermore, by this means it is possible in a simple fashion to arrange that in addition to the stretching of the slug, which occurs with blow-moulding, other functions can be performed by the pressurised medium.

It is particularly simple to carry out the said process if the pressure is controlled by altering the flow rate of the pressurised medium supplied to the slug. In so doing, the flow rate will advantageously be controlled by throttling orifices whose throttling action is modified as described below in accordance with the elapsed time of the blow-moulding operation.

Another feature of the invention is that the pressure of the pressurised medium supplied to the slug is controlled by the deformation which the slug undergoes during the blow-moulding operation. Control of the pressurised medium is not externally dictated but is carried out automatically in dependence upon the particular operating condition.

The injection lance or mandrel end containing the injection orifice is preferably equipped with a longitudinally displaceable cup component which defines in relation to the mandrel an annular gap by which to throttle the flow of pressurised medium exiting from the orifice. This has the advantage that the blow-moulding operation can be controlled automatically, as a function of the particular state of deformation of the slug. In inflating the slug, longitudinal and peripheral stretching must take place in a superimposed manner. Through the action of the annular gap between the longitudinally displaceable cup element and the mandrel itself, it is possible very simply, at the commencement of the blow-moulding operation, to achieve predominantly elongation of the slug until the latter touches the base of the cavity of the blow-mould. Thereafter, stretching in the peripheral direction predominates until the mould cavity is completely filled. Thus, optimum properties on the part of the finished hollow body can be achieved, if precise pressure conditions are adhered to. It is of advantage, furthermore, that the control of the pressurised medium is exercised directly prior to its entry into the working space between the injection lance or mandrel and the slug. Furthermore, the base of the slug is centred and guided by the cup element on the injection mandrel during lenghtwise stretching. This prevents lateral deflection of the slug during the blow-moulding operation.

The throttling action of the annular gap can be modified in dependence upon the extent of longitudinal displacement of the cup element. For example, the internal diameter of the cup element can be stepped so that initially the throttling action of the annular gap is more marked and later decreases so that the flow rate into the working space increases and the rate of stretch in the peripheral direction rises correspondingly. In this way, the blow-moulding time can be reduced.

Alternatively, the internal wall of the cup element can be tapered. This enables the mean gapwidth to change in a continuous manner.

As a further alternative, the internal wall of the cup element can be provided in part at least with annular grooves. If that part of the cup element which contains the annular grooves cooperates with the injection lance or mandrel to define the annular gap, then said grooves create alternate sections of high flow velocity on the one hand and others of lower velocity and severe turbulence.

DESCRIPTION OF THE PREFERRED EMBODIMENTS

Figure 1:
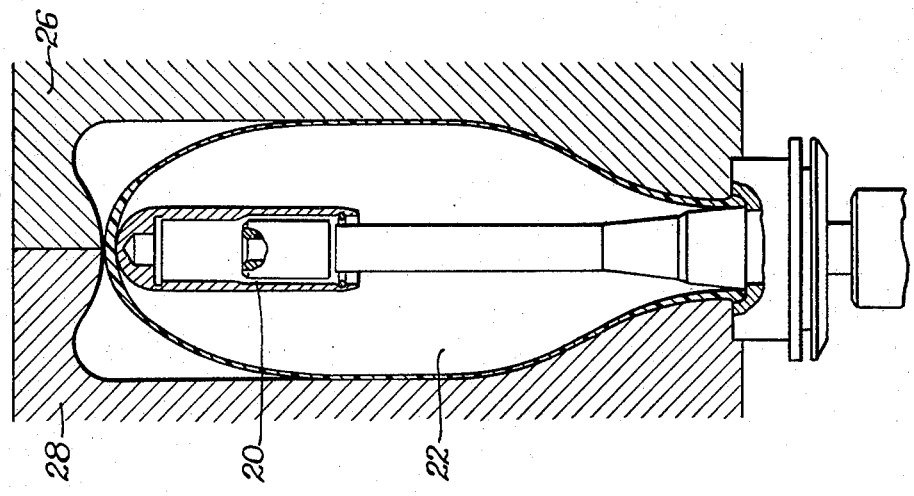
FIG. 1 is a sectional view of a blow-mould with a slug in position upon the injection lance or mandrel.

The embodiment shown in the drawings comprises a device for the controlled application of pressure to the slug, the latter being arranged directly on the injection lance or mandrel 10, so that pressure control is particularly suitable for the maintenance of specific pressure conditions in the working space. The injection lance 10 is provided at its forward end with an opening 12 through which the pressurised medium, normally air, exits. At its forward end, the injection lance 10 has a guide section 14, conveniently of cylindrical form. Over the guide section 14, a cupped component 16 is placed and has a sleeve-like extension 18. Between the guide section 14 and the sleeve-like extension 18, an annular gap 20 is defined which serves as a throttling orifice for the air flowing out of the opening 12 in the lance 10, into the working space 22 between the lance 10 and the slug 24.

In FIG. 1, the blow-mould halves 26, 28 have been closed about the slug 24 which is in position on the cupped component 16, a portion of the slug being enclosed between the lance 10 and the mould-halves 26, 28. During the blow-moulding operation, the slug 24 undergoes superimposed elongation and peripheral stretching. At the commencement of the blow-moulding operation, it is predominantly elongation which takes place until the slug 24 touches the base of the mould cavity defined by the halves 26, 28. Thereafter, it is peripheral stretcing which predominates until the mould cavity is filled.

Figure 2:
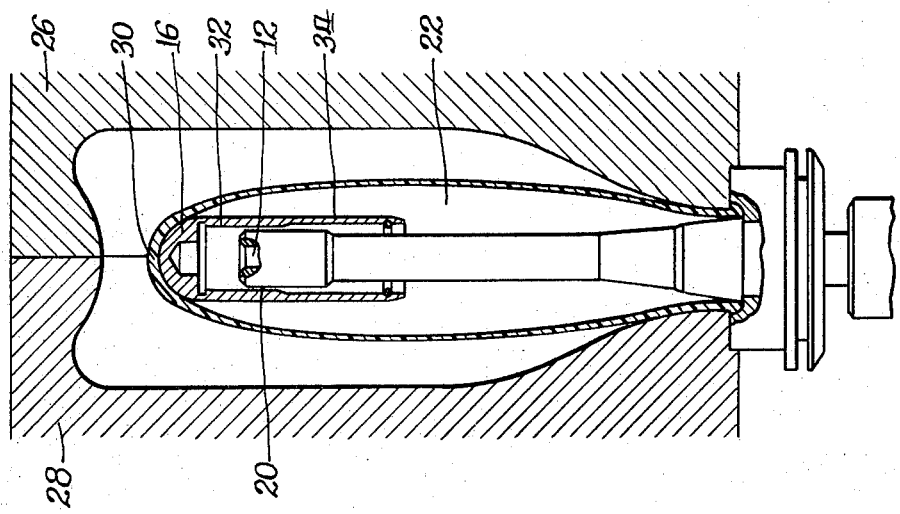
FIG. 2 is a sectional view similar to that of FIG. 1, with the slug shown during the stage in which it is predominantly lengthwise stretching (elongation) which is taking place.

The pressurised medium exiting from the opening 12 in the lance 10, experiences a throttling action in the annular gap 20. This gives rise to a pressure difference at said gap 20. Thus, a pressure develops in the cavity between the guide section 14 and the cupped component 16 and the product of this pressure and the internal cross-sectional area of the cupped component 16, determines the force with which the said component 16 is displaced upwards into engagement with the base 30 of the slug so that it is essentially elongation of the latter which takes place; indeed, as FIG. 2 shows, during the course of the blow-moulding operation, lateral deflection of the slug is prevented until the latter touches the base of the mould cavity defined by the halves 26, 28, whereupon elongation is substantially completed. By the provision of an additional interlocking connection between the slug and cupped component, this effect can be reinforced. The pressurised medium entering the working space 22 through the annular gap 20, at low pressure, is responsible for the peripheral stretching of the slug, this action being superimposed upon the elongation, as shown in FIG. 2, although during this phase of the blow-moulding operation it is elongation which predominates.

Figure 3:
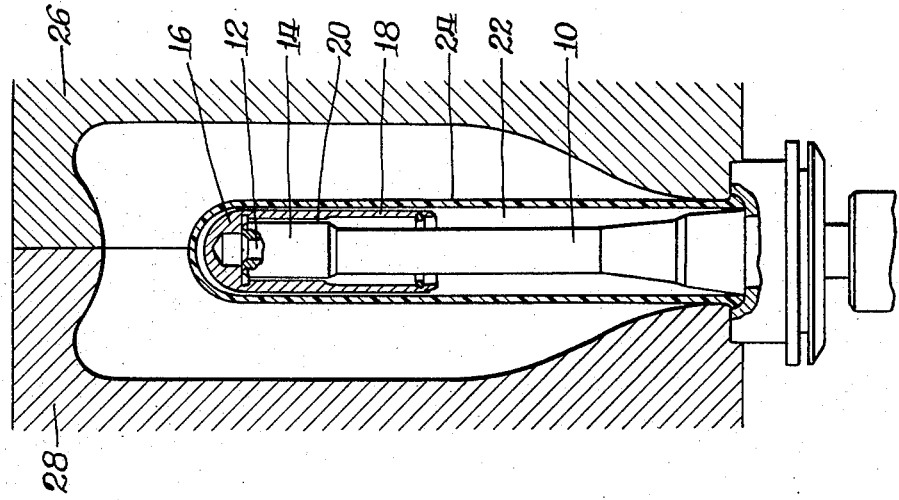
FIG. 3 illustrates a section similar to that of FIG. 1, with the slug in the condition in which it is predominantly peripheral stretching which is taking place.

In the illustrated example, the internal diameter of the sleeve-like extension 18 is stepped. Thus, at the section 32, an annular gap with a more marked throttling effect is created so that the elongation of the slug initially takes place relatively rapidly. When elongation has substantially been completed, as shown in FIG. 3, the section 34 of the sleeve-like extension 18 forms the effective throttling cross-section. Accordingly, in the course of the stretching operation, the throttling action decreases and the flow rate of the pressurised medium rises so that the peripheral stretching rate of the semi-manufacture is increased. In this way, the blow-moulding time can be reduced.

In another embodiment (not shown) the annular gap 20 between the guide section 14 and the sleeve-like extension 18 of the cupped component 16, can be given a tapered form so that the mean width of the annular gap changes as the cupped component displaces. In this fashion, the throttling area increases or decreases during the stretching phase, depending upon the direction of the taper.

As a further alternative, a differential throttling effect can be achieved by providing the cooperating surface of the sleeve-like extension 18, with a number of annular grooves. As soon as the grooved section comes into operation to define the throttling cross-sectional area, alternate regions of high flow velocity and lower flow velocity coupled with severe turbulence are produced, in a manner similar to that encountered in a labyrinth seal.

It is also possible, if the slug has the appropriate physical properties, to increase the throttling action during the stretching operation and therefore to reduce the rate of stretching of the semi-manufacture. A change of the throttling action during the course of the stretching operation may also be advantageous in the context of a special production sequence, for example where, in addition, in the neck region of the slug a pressurised medium having a higher pressure than the normal blow-moulding pressure is to be applied for a short period in order to shape said neck portion, but where this briefly applied increased blow-moulding pressure is to be prevented from producing an unwanted increase in the general rate of stretching of the slug.

It is advantageous, furthermore, in one and the same installation, to use both a rotary spool in the supply line of the pressurised medium, e.g. in a compressed air line, and the cupped component on the injection lance, both controlling the forming process and having an influence on the blow-moulding of the slug. This is highly convenient, for example, if the distance between the rotary spool in the supply line and the injection lances of a series of blow-moulding apparatus is relatively large.

What is claimed is:

1. A blow mould apparatus comprising:

a blow mould;

a mandrel for receiving an open-ended parison, said mandrel having a longitudinal axis and being formed with an outside surface;

means in said mandrel defining a longitudinally extending passage therethrough for passing a pressurized medium, said mandrel passage terminating in a discharge orifice at the end thereof;

an elongated cup member slidably disposed over the discharge end of said mandrel, said cup member being arranged for slidable axial movement along the axis of said mandrel and relative thereof in response to the pressure of a pressurized medium discharged from the mandrel against the closed end of said cup member to substantially elongate the parison in said mould;

said outside surface of said mandrel and the internal surface of said cup member being spaced from each other to define an orifice means which is variable as said cup member is moved relative to said mandrel along the longitudinal axis of said mandrel in response to the pressure of the pressurized medium so that discharge occurs and the orifice moves along the length of said cup member to variably throttle the pressurized medium discharged from said mandrel.

2. A blow mould apparatus comprising:

a blow mould;

a mandrel for receiving an open-ended parison, said mandrel having a discharge end and a longitudinal axis and being formed with an outside surface;

an elongated cup member disposed over the discharge end of said mandrel, said cup member being arranged for slidable axial movement along the axis of said mandrel to elongate the parison in the mould;

said outside surface of said mandrel and said internal surface of said cup member being spaced from each other to define a variable orifice means by which to throttle pressurized medium discharged from said mandrel as said cup member is moved relative to said mandrel along the longitudinal axis of said mandrel to vary the spacing therebetween;

said variable orifice means being an annular gap variable in accordance with the longitudinal displacement of the cup member; and the internal surface of said cup member being stepped, said stepped internal cup surface and said outside surface of said mandrel forming said variable orifice means to thereby throttle the pressurized medium as said cup member moves along said axis.

3. The apparatus of claim 1 wherein said variable orifice means is an annular gap variable in accordance with the longitudinal displacement of the cup member.

4. A blow mould apparatus comprising:
a blow mould;
a mandrel for receiving an open-ended parison, said mandrel having a longitudinal axis and being formed with an annular outside surface;
means in said mandrel defining a longitudinally extending passage therethrough for passing a pressurized medium, said mandrel passage terminating in a discharge orifice at the end thereof;
an elongated cup member disposed over the discharge end of said cup member, said cup member being arranged for slidable axial movement along the axis of said mandrel and relative thereto in response to the pressure of a pressurized medium discharged from the mandrel against the closed end of said cup member to substantially elongate the parison in said mould;
said outside surface of said mandrel and said internal surface of said cup member being spaced from each other, said spacing being variable by the relative movement of said cup member with respect to said mandrel so that discharge occurs and the orifice moves along the length of said cup member to thus provide a change in the rate of flow of the pressurized medium being discharged into the parison from said mandrel.

* * * * *

UNITED STATES PATENT OFFICE
CERTIFICATE OF CORRECTION

Patent No. 3,865,530              Dated February 11, 1975

Inventor(s)   Otto Rosenkranz et al.

It is certified that error appears in the above-identified patent and that said Letters Patent are hereby corrected as shown below:

On the cover sheet item [19] "Jesselalle et al." should read -- Rosenkranz et al. --. item [76] after "Inventors:" insert -- Otto Rosenkranz, --.

Signed and sealed this 22nd day of April 1975.

(SEAL)
Attest:

RUTH C. MASON
Attesting Officer

C. MARSHALL DANN
Commissioner of Patents
and Trademarks